United States Patent
Schafer et al.

(10) Patent No.: US 9,606,700 B2
(45) Date of Patent: Mar. 28, 2017

(54) SELECTION OF HIERARCHICALLY ORGANIZED ITEMS

(71) Applicant: Information Resources, Inc., Chicago, IL (US)

(72) Inventors: Kurt N. Schafer, Chicago, IL (US); Charles H. Field, Oak Park, IL (US); Adam L. Fisher, Salado, TX (US)

(73) Assignee: Information Resources, Inc., Chicago, IL (US)

( * ) Notice: Subject to any disclaimer, the term of this patent is extended or adjusted under 35 U.S.C. 154(b) by 273 days.

(21) Appl. No.: 13/791,417

(22) Filed: Mar. 8, 2013

(65) Prior Publication Data

US 2014/0258939 A1    Sep. 11, 2014

(51) Int. Cl.
*G06F 3/0482* (2013.01)
*G06F 3/0481* (2013.01)
*G06F 3/0483* (2013.01)
*G06F 3/0484* (2013.01)

(52) U.S. Cl.
CPC .......... *G06F 3/0482* (2013.01); *G06F 3/0481* (2013.01); *G06F 3/0483* (2013.01); *G06F 3/04842* (2013.01)

(58) Field of Classification Search
CPC .............................. G06F 3/0482; G06F 3/0483
See application file for complete search history.

(56) References Cited

U.S. PATENT DOCUMENTS

| | | | | |
|---|---|---|---|---|
| 5,065,347 A | * | 11/1991 | Pajak | G06F 17/30126 715/776 |
| 5,204,947 A | * | 4/1993 | Bernstein | G06F 17/30855 345/163 |
| 5,485,175 A | * | 1/1996 | Suzuki | G06F 3/0482 715/835 |
| 5,848,421 A | * | 12/1998 | Brichta | G06F 17/30371 |
| 5,930,764 A | * | 7/1999 | Melchione | G06Q 30/02 705/35 |
| 6,236,400 B1 | * | 5/2001 | Guerrero | 715/841 |
| 6,380,947 B1 | * | 4/2002 | Stead | 345/645 |
| 6,691,282 B1 | * | 2/2004 | Rochford | G06F 3/0481 707/E17.01 |
| 7,191,411 B2 | * | 3/2007 | Moehrle | G06F 17/30126 715/829 |
| 7,363,593 B1 | * | 4/2008 | Loyens et al. | 715/853 |
| 7,418,670 B2 | * | 8/2008 | Goldsmith | G06F 3/0482 715/810 |

(Continued)

*Primary Examiner* — William Bashore
*Assistant Examiner* — Nathan Shrewsbury
(74) *Attorney, Agent, or Firm* — Strategic Patents, P.C.

(57) ABSTRACT

Disclosed herein are user interfaces and related systems and methods for selecting hierarchically arranged items in order to facilitate subsequent operations on an accumulation of such data selected from throughout a hierarchy. More specifically, a columnized user interface is disclosed that includes a final column containing an accumulation of items selected from various locations within the hierarchy. A user may interactively navigate throughout the hierarchy in one or more other columns, while selectively adding specific items from any such hierarchical locations in the final column for subsequent processing. Other tools may support grouping into favorites, recall of previous selections, or other operations to facilitate rapid creation and recreation of item groups for processing.

20 Claims, 5 Drawing Sheets

(56) References Cited

U.S. PATENT DOCUMENTS

| | | | | |
|---|---|---|---|---|
| 7,546,549 B2* | 6/2009 | Danas | G06F 17/3097 | |
| | | | 707/999.102 | |
| 7,694,233 B1* | 4/2010 | Ording | G06F 3/0481 | |
| | | | 715/788 | |
| 7,694,239 B2* | 4/2010 | Swain | G06F 17/30572 | |
| | | | 715/816 | |
| 7,831,612 B2* | 11/2010 | Le et al. | 707/775 | |
| 8,296,682 B2* | 10/2012 | Sloo | G06F 17/30126 | |
| | | | 715/853 | |
| 8,312,366 B2* | 11/2012 | Folting | G06F 17/246 | |
| | | | 707/809 | |
| 8,561,008 B2* | 10/2013 | Steiner | 717/100 | |
| 8,640,055 B1* | 1/2014 | Dunning | G06F 3/0481 | |
| | | | 715/853 | |
| 2001/0043238 A1* | 11/2001 | Guerrero | G06F 3/0482 | |
| | | | 715/853 | |
| 2002/0196293 A1* | 12/2002 | Suppan | G06F 3/0482 | |
| | | | 715/853 | |
| 2003/0227491 A1* | 12/2003 | Moehrle | 345/854 | |
| 2004/0186762 A1* | 9/2004 | Beaven et al. | 705/8 | |
| 2005/0066293 A1* | 3/2005 | Hunt | 715/854 | |
| 2007/0185894 A1* | 8/2007 | Swain et al. | 707/102 | |
| 2008/0028337 A1* | 1/2008 | Michaud | G06F 3/0482 | |
| | | | 715/810 | |
| 2008/0295038 A1* | 11/2008 | Helfman | G06T 11/206 | |
| | | | 715/853 | |
| 2009/0222762 A1* | 9/2009 | Denver | G06F 3/0483 | |
| | | | 715/793 | |
| 2009/0319956 A1* | 12/2009 | Emard et al. | 715/854 | |
| 2010/0205521 A1* | 8/2010 | Folting | G06F 17/246 | |
| | | | 715/227 | |
| 2011/0016432 A1* | 1/2011 | Helfman | 715/843 | |
| 2012/0173478 A1* | 7/2012 | Jensen et al. | 707/602 | |
| 2012/0233533 A1* | 9/2012 | Yucel et al. | 715/212 | |
| 2012/0281012 A1* | 11/2012 | Neway | G06Q 10/10 | |
| | | | 345/619 | |
| 2013/0046708 A1* | 2/2013 | Griep et al. | 705/348 | |
| 2014/0129969 A1* | 5/2014 | Chasman et al. | 715/769 | |
| 2014/0282109 A1* | 9/2014 | Wenger | G06F 3/0482 | |
| | | | 715/753 | |
| 2014/0316956 A1* | 10/2014 | Loewen | G06Q 30/04 | |
| | | | 705/34 | |

* cited by examiner

SELECTION OF HIERARCHICALLY ORGANIZED ITEMS

BACKGROUND

While a variety of user interfaces exist for navigating file structures, relational databases, and other hierarchically arranged computer items, there remains a need for interface tools to permit accumulation or aggregation of items from throughout such hierarchies for global processing.

SUMMARY

Disclosed herein are user interfaces and related systems and methods for selecting hierarchically arranged items in order to facilitate subsequent operations on an accumulation of such data selected from throughout a hierarchy. More specifically, a columnized user interface is disclosed that includes a final column containing an accumulation of items selected from various locations within the hierarchy. A user may interactively navigate throughout the hierarchy in one or more other columns, while selectively adding specific items from any such hierarchical locations in the final column for subsequent processing. Other tools may support grouping into favorites, recall of previous selections, or other operations to facilitate rapid creation and recreation of item groups for processing.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes selection of products in a product hierarchy, such as product hierarchies used to provide analytics for consumer packaged goods. While this is a useful example of a data environment having a large number of hierarchically arranged items, within which a variety of useful analytics might be provided on user-specific selections of products, it will be understood that the methods and systems described herein have wider applicability, and might be usefully applied in any context where a large number of items or categories are arranged into a hierarchy such as supply chain or inventory management. More generally the methods and systems disclosed herein may be usefully employed in any context where items are searched for and selected across large hierarchies of available items.

It will also be noted that many terminologies are used in the art to describe hierarchies of information. For convenience, two terms are described here. A 'level' of a hierarchy is a location within a hierarchical structure that may have a parent level above the level and one or more child levels below the level within the hierarchy. Thus for example, at a particular level within a hierarchy, there may be zero or more levels that are lower levels within the hierarchy. In the user interfaces described below, a level may be navigated to, and as a level within the hierarchy, may contain one or more child levels in a lower level of the hierarchy, and/or one or more items. The term 'item' is used herein in the sense of a leaf node of a tree. That is, the item is a terminal data item or object positioned within a level of the hierarchy. The item may be data, metadata, a link, an object, or any other computerized object, structure, or representation. In general, the item selector contemplated herein assists a user in selecting items that might be found within various levels of a hierarchy. The term 'member' is also provided as a term that refers to levels and/or items. Thus a level may include members that are either items or child levels or both. The terms 'level,' 'item' and 'member' are intended to be general in nature, and should be broadly construed unless a more specific meaning is explicitly provided or otherwise clear from the context.

Figure 1:
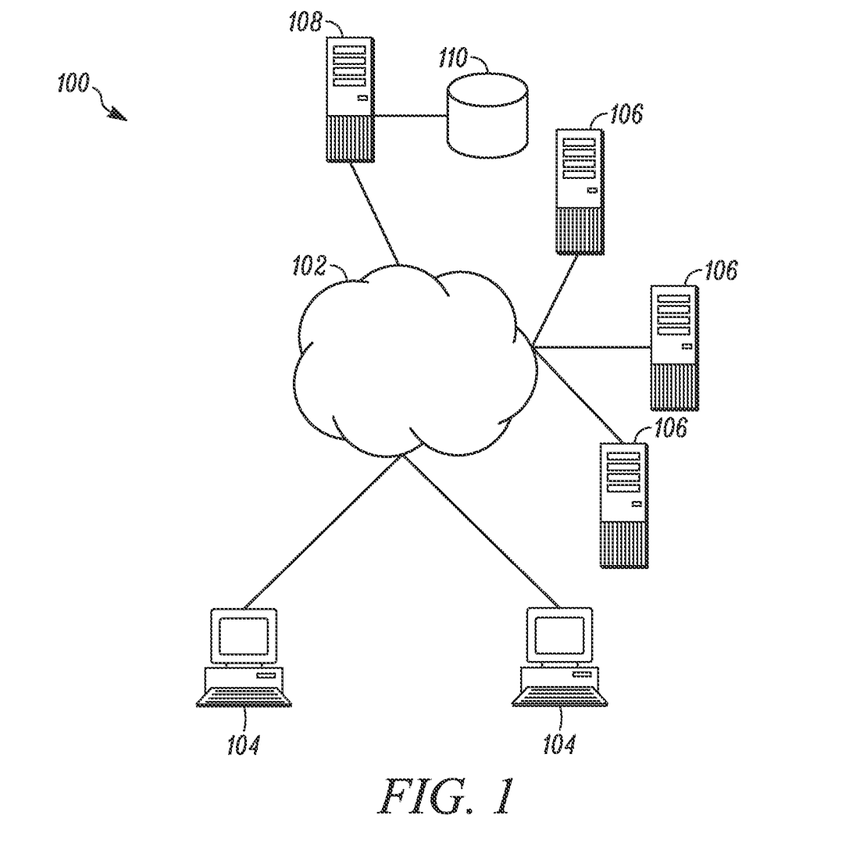
FIG. 1 shows entities participating in an item selection system.

FIG. 1 shows entities participating in an item selection system. The system 100 may include a data network 102 such as the Internet that interconnects any number of clients 104, data sources 106, and a server 108 (which may include a database 110). In general, the server 108 may secure data from the various data sources 106 and provide a user interface to clients 104 for selecting items within hierarchical data stored in the data sources 106.

The data network 102 may include any network or combination of networks suitable for interconnecting other entities as contemplated herein. This may, for example, include the Public Switched Telephone Network, global data networks such as the Internet and World Wide Web, cellular networks that support data communications (such as 3G, 4G and LTE networks), local area networks, corporate or metropolitan area networks, wide area wireless networks and so forth, as well as any combination of the foregoing and any other networks suitable for data communications between the clients 104, data sources 106 and the server 108.

The clients 104 may include any device(s) operable by end users to interact with the server 108 through the data network 102. This may, for example, include a desktop computer, a laptop computer, a tablet, a cellular phone, a smart phone, and any other device or combination of devices similarly offering a processor and communications interface collectively operable as a client device within the data network 102. In general, a client 104 may interact with the server 108 and locally render a user interface such as a web page or the like supporting interaction by the end user with the data sources 106 services provided by the server 108.

The data sources 106 may include any sources of data for which a user might select items in a hierarchy. Data sources 106 may, for example, include a number of hierarchies relate to consumer packaged goods, such as a product hierarchy, a geography hierarchy, a time hierarchy, and a fact hierarchy. The fact hierarchy may contain any suitable measures or facts used in analytics. For example, the fact hierarchy may contain sales facts (e.g., sales data) or any other information. It will be appreciated that in general such hierarchies may be stored in the data sources 106 remote from the server 108, or stored in a database 110 local to the server 108, or some combination of these, all of which are generally referred to herein as a database. In general, the physical and logical arrangement of such a database may be in any form, with the server 108 providing a seamless interface relieving a user at a client 104 of such internal structural complexities.

The server 108 may include any number of physical or logical machines according a desired level of service or any other design parameters. In general, the server 108 may be configured to provide a user interface to facilitate navigation around a hierarchy of items and the accumulation of items from throughout the hierarchy, all as described below. Once accumulated, a selected list of items may be processed in any suitable manner using a collection of companion reporting functions. In one aspect, the server 108 may include a number of separate functional components (which may be similarly logically or physically separated, or embodied in a single machine) such as one server coupled to the data sources 106 for managing communications therewith, such as through an application or database programming interface, and a second server that provides a user interface to clients 104 based upon data in the data sources 106. In one aspect, the server 108 may be configured to extract metadata for the number of hierarchies, either at the data sources 106 or the local database 110, and to control a configuration of the user interface described below according to the metadata.

Figure 2:
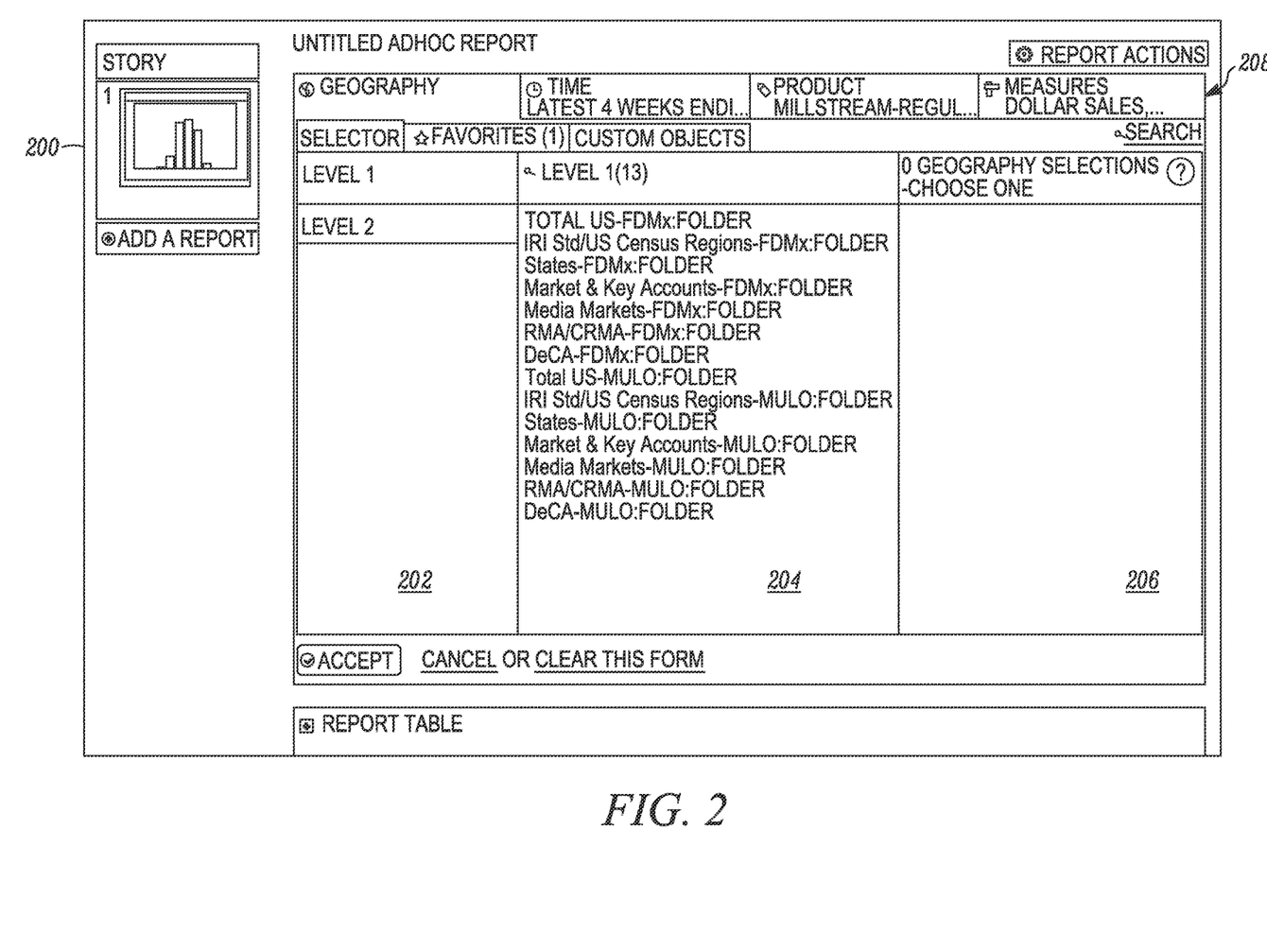
FIG. 2 shows a user interface for item selection.

FIG. 2 shows a user interface for item selection. The interface 200 may be embodied in web page transmitted from a server to a client or any other suitable interface technology. A variety of web technologies are known in the art for supporting interactive interfaces such as those described below, and are omitted here for simplicity. Similarly, the presentation aspects of the interface 200 may be provided as an application or other software executing on a client device, with underlying data and functionality supported by a remote server coupled through a programming interface or the like to the locally executing software. Again, these implementation details are neither necessary nor helpful to an understanding of the user interfaces disclosed herein. In general, the interface 200 may include a first column 202, a second column 204, a third column 206, and a row 208 above the columns.

The first column 202 may be configured to interactively select a level of a hierarchy. In general the first column 202 may depict each of the available levels within the hierarchy organized as listings in tabular form within the first column 202. Each one of the group of controls may be responsive to a first user interaction by populating the second column with one or more members of a corresponding one of the number of levels in the hierarchy. Thus by clicking on or otherwise interacting with one of the available levels, a user may select that level within the hierarchy to populate the second column 204. Visual and navigational feedback may be provided by highlighting the selected level in the first column 202, and by updating information displayed in the second column 204. In this manner, a user may interact with listings in the first column 202 to provide a selected level including one or more members (i.e., items and/or sublevels) for display in the second column 204.

In general, the first column 202 may usefully be configured to always display navigational information for the entire hierarchy including, e.g., a listing of all available levels within the hierarchy, along with a current location or level displayed in the second column 204. The second column 204 may be configured differently to show information for a current level, which is updated as a user navigates from level to level within the hierarchy, as described below in greater detail.

The second column 204 may be positioned to the right of the first column to provide an intuitive orientation as a sub-level within the hierarchy. The second column 204 may be configured to responsively display levels (that is sublevels) of the selected level chosen in the first column 202. The second column 204 may be further configured to interactively select one of the one or more levels of the selected level, and when the selected level includes a number of items, to interactively select one or more of the items, thereby providing at least one selected item. Thus the second column 204 may display a terminal level of the hierarchy that contains only items, or the second column 204 may display an intermediate level of the hierarchy which contains sublevels, and potentially one or more items present at the selected level.

The third column 206 may be positioned to the right of the second column 204, and may be configured to interactively display the at least one selected item from the second column 204. The third column 206 may be further provide a user control to remove the at least one selected item from the third column. In this manner a user may add selections to the third column 206 (e.g., by selecting them from the second column 204) and remove selections from the third column 206 (e.g., by de-selecting them from the third column 206). In general, the third column 206 may retain selected items added from the second column over a number of user interactions so that a user may navigate within the hierarchy and accumulate selected items from throughout the hierarchy in the third column 206.

The row 208 may extend above the first column 202, the second column 204, and/or the third column 206, and may include a number of controls to select a hierarchy from a number of available hierarchies to populate the user interface, or more specifically as an initial matter, to populate the first column 202 of the interface 200 with levels of the selected hierarchy. FIG. 2 depicts a degenerate case where the selected hierarchy ("geography") contains a single level. As such, the second column 204 may be automatically populated with items from that single level, and a user may select one or more of the listed geographies for addition to the selected list in the third column 206.

Figure 3:
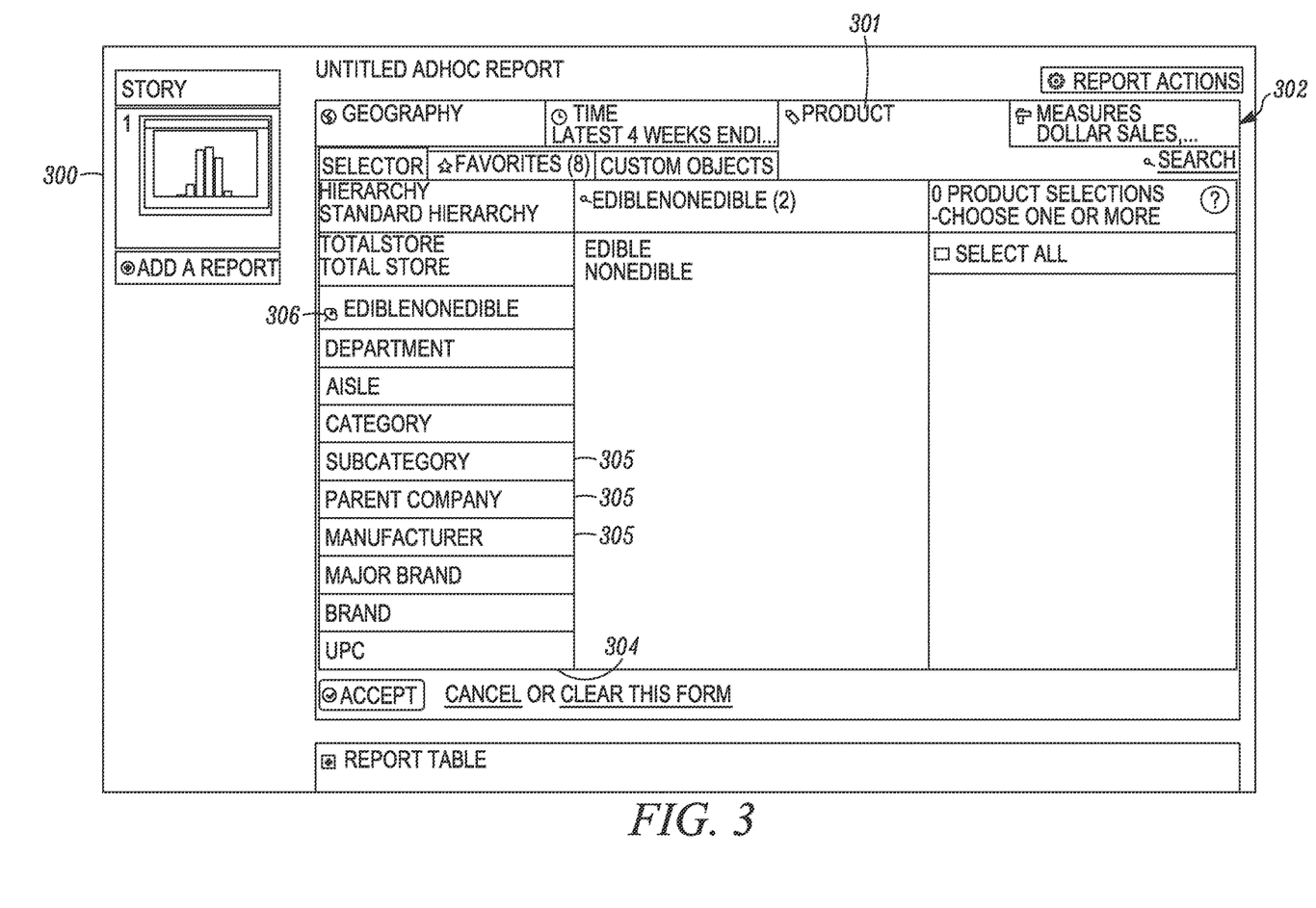
FIG. 3 shows a user interface for item selection.

FIG. 3 shows a user interface for item selection. In the user interface 300, one of the controls 301 in the row 302 ("product") has been selected. In response, the user interface 300 has populated the first column 304 with a selected, corresponding hierarchy. As mentioned above, the user interface 300 may initially select a top level of the selected hierarchy for display (with child levels populating the second column).

The first column 304 may include a vertically arranged group of controls 305, each one of the group of controls 305 corresponding to one of a number of levels of one of the hierarchies selected from the row 302. A selected one of the vertically arranged group of controls in the first column (e.g., the one presently displayed in the second column) may optionally include a visual indicator such as highlighting, a color change, or the like to indicate that the corresponding one of the number of levels is currently displayed in the second column. For example, the current level (initially the top level) may be highlighted with a different color or a navigational icon 306 to show the current location within the hierarchy, as depicted in FIG. 3.

The user interface 300 may also include a control that provides an additional hierarchy selection tool 306 within the first column 304 or some other suitable location within the user interface 300. Such a tool may be useful, for example, where a data set (such as "products") is represented in a number of different, alternative hierarchies. For examples, a data set of items may be classified differently by different users, or data may be periodically reclassified over time, resulting in different hierarchical representations of the same data. In such circumstances, a drop down list or the like may be included as the hierarchy selection tool 306 to permit a user of the user interface 300 to interactively select a desired one of the various possible hierarchies. This control may be used for selecting from among a plurality of hierarchies responsive to one of the number of controls in the row 302, and may be responsive to a user interaction by permitting a selection of one of a number of alternative hierarchies as the hierarchy used to populate the first column 304 (and the remaining columns through a series of subsequent user interactions).

Figure 4:
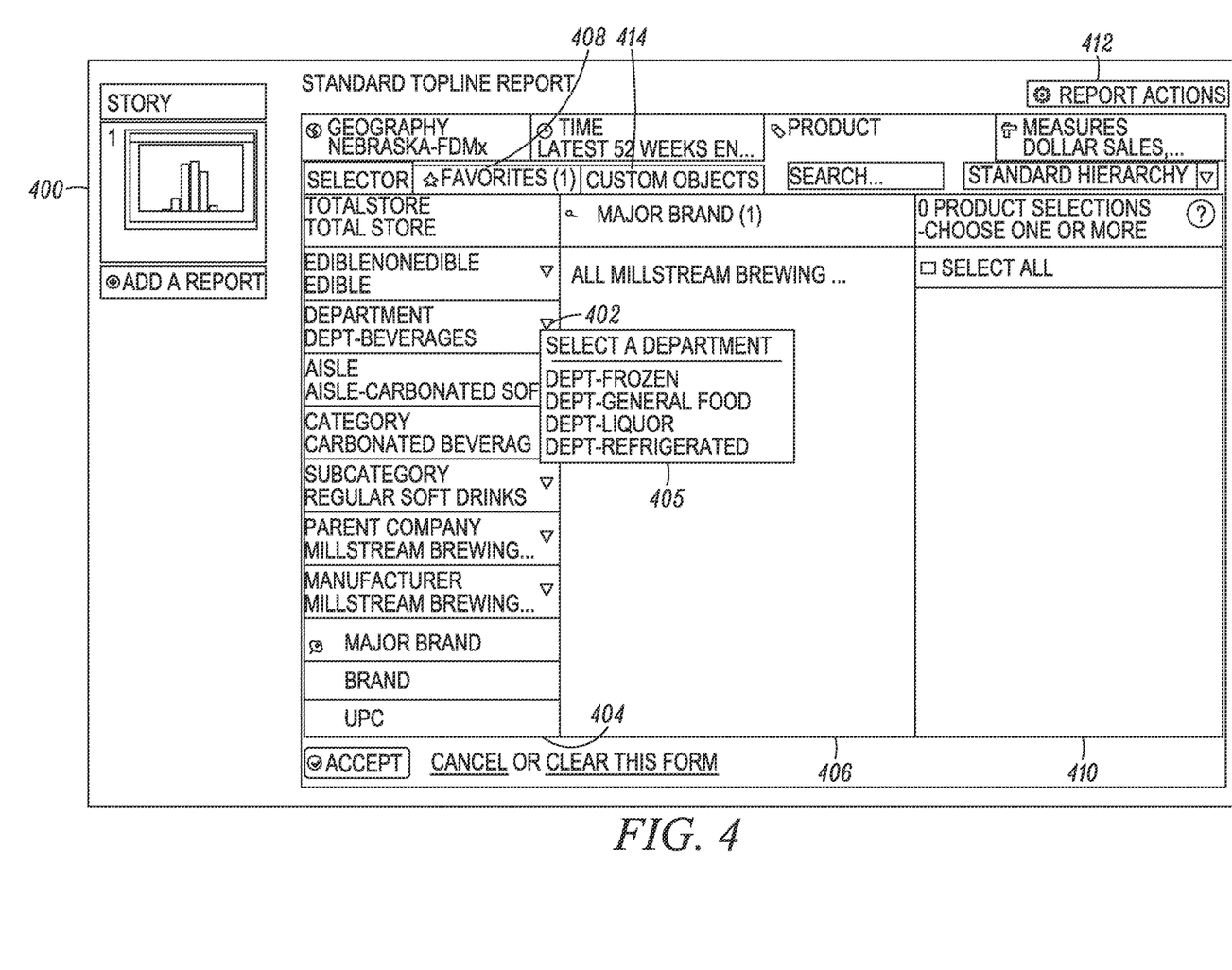
FIG. 4 shows a user interface for item selection.

FIG. 4 shows a user interface for item selection. The interface 400 may include a number of additional features.

For example, a control 402 (or some or all of the controls) in the first column 404 may be responsive to a mouse over event or the like by displaying a drop down control 405 with a selectable list of child levels, that is, one or more members of a lower one of the number of levels in the selected hierarchy. By selecting one of the members of the selectable list, a user may populate the second column with any members contained within the selected level of the hierarchy. With this control, a user can skip the manual step of populating the second column 406 and separately making a selection from within the second column 406. It will also be noted that the user may operate such a drop down control 405 for any level within the hierarchy in order to facilitate convenient navigation throughout the hierarchy from the first column 404.

As another example, the interface 400 may include a favorites control 408 or the like for returning to a predetermined state of the first column 404 and the second column 406. The favorites control 408 may permit convenient navigation to commonly used locations or items without making any modifications to the selected items (if any) in the third column 410.

The interface 400 may also include a control 412 to run a report based on the selections contained in the third column 410. It will be generally appreciated that the purpose of selecting items is not the selection per se, but instead to enable analytics on the selected items that have been obtained from a larger data set. A wide range of reports are known in the art, and may include charts, spreadsheets, aggregations, timelines, statistics, and so forth. Any such report that might usefully be run on a data set may be provided by a server or the like, and may be accessed for the selected items using the control 412 to run a report. The control 412 may permit selection of a number of premade reports, or the control 412 may navigate a user to a report creation interface in which a user can customize report types and desired outputs.

Once the control 412 has been used to run a report, additional report actions may be supported by a report action control 413, which may for example support export, printing, or any other operations that might usefully be performed on a report.

The interface 400 may include a control 414 to populate the third column 410 with a number of predetermined selections. While the favorites control 408 permits navigation to a predetermined location within a hierarchy, the control to populate the third column 410 preselects a group of items, which may for example be a subset of items at a single location within the hierarchy or a number of items from multiple locations within the hierarchy, and populates the third column 410 with those items. In this manner, a user may pre-aggregate items of from throughout the hierarchy for single-click recovery and use in report creation. This does not prevent a user from adding to or subtracting from the preselected group, and a user may modify the preselected group in any manner using the other techniques described herein before creating a report. Instead, the control 414 provides a shortcut for accessing a group of items of recurring interest. Any number of such groups may be created and recovered using the control 414.

Figure 5:
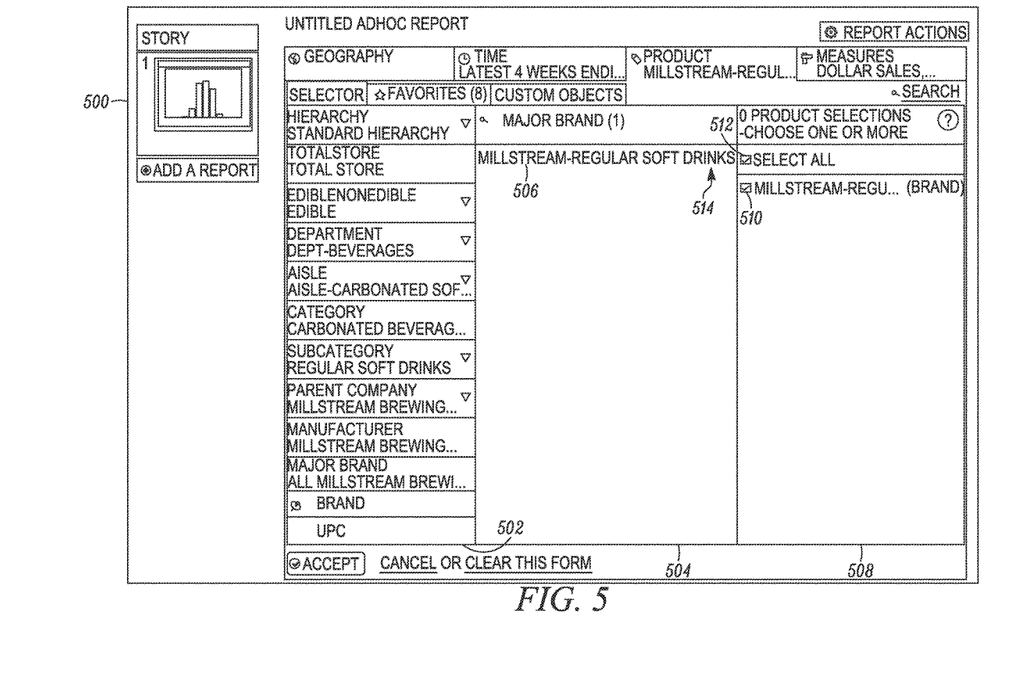
FIG. 5 shows a user interface for item selection.

FIG. 5 shows a user interface for item selection. In the depicted user interface 500, a bottom level of the hierarchy is selected in the first column 502. The second column 504 shows an item 506 that is not a child level in the hierarchy. After a user selection of the item 506 in the second column, the item 506 is added to the third column 508 (positioned to the right of the second column 504) as depicted. In embodiments, any available items (not child levels) in the second column 504 may be automatically placed in the third column 508, and such items in the third column 508 may be default be selected or deselected, e.g., using a check box 510 or the like. As illustrated, the item 506 is selected, as indicated by the checkbox 510 containing a check. While only a single item is depicted, it will be understood that any number of items may be included according to the number of items in the current level of the second column 504. A user may select and deselect items according to desired inclusion in data for reporting, and the third column 508 may further include a "select all" control 512 or the like to permit global operations on the contents of the third column 508.

Using an interface configured as described above, a user may navigate through a hierarchy and accumulate items of interest within the hierarchy. Each item or child level in the second column 504 may be configured as a control, with these "controls" in a vertically arranged group ordered alphabetically, numerically or in any other manner particular to the hierarchy. Thus each control in the second column 504 may correspond to one or more members 514 (also referred to as the control 514, with the visual component that represents the member 514 (e.g., text) also forming an active area for the control 514 associated with the member 514) of the level selected in the first column 502. Each such control 514 may be responsive to user interactions in a number of ways. When one of the members 514 includes a lower level of a number of levels in the hierarchy beneath a current level displayed in the second column 504 (e.g., child levels), the control 514 may respond to a user interaction by populating the second column with a vertically arranged group of one or more members of the lower level in place of the present level. In this manner, a user can interactively drill down into levels of the hierarchy by interactions with controls 514 (or members 514) in the second column 504. When the one or more members 514 include an item 506, the control 514 may respond to a user interaction by populating the third column 508 with the item 506. In this manner, a selected item may be placed in the third column 508.

It will be noted that under certain circumstances, hierarchies will only have items at a lowest level of the hierarchy. However this is not required, and items may be located at various levels within a hierarchy. Furthermore, the hierarchy may have different depths in different branches. That is one child level may have no sub-levels, while another child level may have several sub-levels. In one aspect, this may be implemented by placing a number of empty levels between a top and a bottom level so that selected items are always within a bottom level of the hierarchy, although such an arrangement is not required for the interfaces described herein.

In general, the third column 508 may be configured to retain items selected from the second column 504 over a series of user interactions. More specifically, as a user navigates from level to level within the hierarchy, the user may accumulate items of interest in the third column 508. Once a desired number of items are accumulated in the third column 508 (which may be a single item or any number of items), the user may initiate reporting functions for the selected item(s). The number of selected items accumulated in the third column 508 may be vertically arranged in the third column 508 as selections, and each one of the selections may include a control to remove the one of the selections from the third column, such as the checkbox 510 depicted in FIG. 5.

The user interfaces and methods or processes for providing same as described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computing device for selecting hierarchically arranged items, the computing device including a display, a processor, and a memory storing instructions that, when executing on the processor provide a user interface consisting of three item selection columns for respectively navigating to a level within a hierarchy, selecting items within the level, and accumulating items selected using the first two columns, the user interface comprising:
    a first column of the three item selection columns, the first column displaying available levels within the hierarchy in tabular form, and the first column configured to interactively receive a user selection of a level of the hierarchy, thereby providing a selected level including one or more members, and the first column configured to display navigational information for the hierarchy including a listing of available levels within the hierarchy including the selected level, without displaying items within any of the available levels;
    a second column of the item selection columns positioned right of the first column and configured to interactively receive the user selection of the selected level and to responsively display the selected level, and when the selected level includes a number of items, to display the number of items and interactively receive a user selection of one or more of the items, thereby providing at least one selected item;
    a third column of the item selection columns positioned right of the second column configured to interactively display the at least one selected item and providing a user control to remove the at least one selected item from the third column, wherein the third column retains selected items added from the second column over a number of user interactions; and
    a row extending above one or more of the first, second, and third columns, the row including a number of controls to select a hierarchy to populate the first column.

2. The computing device of claim 1 wherein the user interface further comprises a control within the first column for selecting from among a plurality of hierarchies responsive to one of the number of controls in the row.

3. A system comprising:
    a database storing items organized into a number of hierarchies, each one of the hierarchies having a number of levels; and
    a server configured to provide a user interface including a row horizontally extending above a number of columns, wherein the user interface consists of three columns for selection of items within a selected hierarchy including a first column for navigation to a level, a second column for selection of items within the level, and a third column for displaying items selected from a number of levels, wherein the row includes one or more controls to select a hierarchy from a number of hierarchies to populate the user interface;

a first column of the three columns displaying available levels within the hierarchy in tabular form and including a vertically arranged group of controls, each one of the group of controls corresponding to one of the number of levels of one of the hierarchies selected from the row, the first column configured to display navigational information for the one of the hierarchies including a listing of available levels within the hierarchy including a selected level within the one of the hierarchies, without displaying items within any of the available levels; and a second column of the three columns positioned right of the first column and including a vertically arranged group of one or more controls, each of the one or more controls corresponding to one of a number of members of the selected level from the first one of the three columns, and each one of the one or more controls responsive to a second user interaction by:

when the number of members includes a lower level of the number of levels in the selected hierarchy beneath a current level displayed in the second column, populating the second column with a vertically arranged group of one or more members of the lower level in place of the one of the number of levels selected from the first one of the three columns, and when the number of members includes an item in the current level, responding to an interaction with the item by populating a third column of the three columns positioned right of the second column with the item, thereby providing a selected item in the third column; wherein the third column is configured to retain a number of items selected from the second column over a series of user interactions.

4. The system of claim 3 further comprising a first control within the first column of the user interface responsive to a user interaction by permitting a selection of one of a number of alternative hierarchies as the hierarchy used to populate the first column.

5. The system of claim 3 wherein the third column accumulates a number of selected items vertically arranged in the third column as selections, each one of the selections including a control to remove the one of the selections from the third column.

6. The system of claim 5 further comprising a control to run a report based upon the selections.

7. The system of claim 3 further comprising a control to populate the third column with a number of predetermined selections.

8. The system of claim 3 wherein the number of hierarchies relate to consumer packaged goods.

9. The system of claim 3 wherein the number of hierarchies include a product hierarchy, a geography hierarchy, and a fact hierarchy.

10. The system of claim 9 wherein the fact hierarchy includes sales facts.

11. The system of claim 3 wherein the server is configured to extract metadata for the number of hierarchies from the database and to control a configuration of the user interface according to the metadata.

12. The system of claim 3 wherein at least one of the number of levels above the bottom level of one of the hierarchies includes a selectable item for selection and placement in the third column.

13. The system of claim 3 wherein a selected one of the vertically arranged group of controls in the first column includes a visual indicator that the corresponding one of the number of levels is currently displayed in the second column.

14. The system of claim 3 wherein the user interface includes a favorites control for returning to a predetermined state of the first column and the second column without modifications to any selected items in the third column.

15. The system of claim 3 wherein one or more of the group of controls in the first column is responsive to a mouse over event by displaying a selectable list of one or more members of a lower one of the number of levels in the selected hierarchy for populating the second column.

16. A computer program product for providing a user interface, the computer program product comprising computer executable code embodied in a non-transitory computer readable medium that, when executing on one or more computing devices, provides the user interface wherein the user interface includes a row horizontally extending above a number of columns for selecting hierarchically arranged items from items organized into a number of hierarchies each having a number of levels, the number of columns consisting of three columns including a first column for navigation to a level, a second column for selection of items within the level, and a third column for displaying items selected from a number of levels, further wherein:

the row includes one or more controls to select a hierarchy from a number of hierarchies to populate the user interface;

a first column of the three columns displaying available levels within the hierarchy in tabular form and including a vertically arranged group of controls, each one of the group of controls corresponding to one of the number of levels of one of the hierarchies selected from the row, the first column configured to display navigational information for the one of the hierarchies including a listing of available levels within the hierarchy including a selected level within the one of the hierarchies, without displaying items within any of the available levels;

and a second column of the three columns positioned right of the first column and including a vertically arranged group of one or more controls, each of the one or more controls corresponding to one of a number of members of the selected level from the first one of the three columns, and each one of the one or more controls responsive to a second user interaction by:

when the number of members includes a lower level of the number of levels in the selected hierarchy beneath a current level displayed in the second column, populating the second column with a vertically arranged group of one or more members of the lower level in place of the one of the number of levels selected from the first one of the three columns, and when the number of members includes an item in the current level, responding to an interaction with the item by populating a third column of the three columns positioned right of the second column with the item, thereby providing a selected item in the third column; wherein the third column retains a number of items selected from the second column over a series of user interactions.

17. The computer program product of claim 16 further comprising a second control within the user interface for interactively selecting one of the number of hierarchies.

18. The computer program product of claim 16 wherein the third column retains a number of selected items vertically arranged in the third column as selections, each one of the selections including a control to remove the one of the selections from the third column.

19. The computer program product of claim 18 wherein the user interface further includes a control to run a report based upon the selections.

20. The computer program product of claim 16 wherein the user interface further includes a control to populate the third column with a number of predetermined selections.

* * * * *